(12) United States Patent
Medina et al.

(10) Patent No.: US 9,437,188 B1
(45) Date of Patent: Sep. 6, 2016

(54) BUFFERED REPROCESSING FOR MULTI-MICROPHONE AUTOMATIC SPEECH RECOGNITION ASSIST

(71) Applicant: Knowles Electronics, LLC, Itasca, IL (US)

(72) Inventors: Eitan Asher Medina, Palo Alto, CA (US); David Pearce, Sunnyvale, CA (US)

(73) Assignee: Knowles Electronics, LLC, Itasca, IL (US)

( * ) Notice: Subject to any disclaimer, the term of this patent is extended or adjusted under 35 U.S.C. 154(b) by 0 days.

(21) Appl. No.: 14/667,650

(22) Filed: Mar. 24, 2015

Related U.S. Application Data

(60) Provisional application No. 61/971,793, filed on Mar. 28, 2014.

(51) Int. Cl.
*G10L 15/00* (2013.01)
*G10L 21/00* (2013.01)
*G10L 15/08* (2006.01)

(52) U.S. Cl.
CPC ...................................... *G10L 15/08* (2013.01)

(58) Field of Classification Search
CPC ............ G01N 2291/0258; H04R 1/10; H04R 2201/107; H04R 2420/07; H04R 3/12
USPC .................................................. 704/231, 275
See application file for complete search history.

(56) References Cited

U.S. PATENT DOCUMENTS

| | | | |
|---|---|---|---|
| 3,946,157 | A | 3/1976 | Dreyfus |
| 4,797,924 | A | 1/1989 | Schnars et al. |
| 4,813,076 | A | 3/1989 | Miller |
| 5,054,085 | A | 10/1991 | Meisel et al. |
| 5,214,707 | A | 5/1993 | Fujimoto et al. |

(Continued)

FOREIGN PATENT DOCUMENTS

| | | |
|---|---|---|
| CN | 104247280 A | 12/2014 |
| EP | 2962403 A1 | 1/2016 |

(Continued)

OTHER PUBLICATIONS

International Search Report & Written Opinion dated Jun. 26, 2014 in Patent Cooperation Treaty Application No. PCT/US2014/018780, filed Feb. 26, 2014.

(Continued)

*Primary Examiner* — Charlotte M Baker
(74) *Attorney, Agent, or Firm* — Carr & Ferrell LLP

(57) ABSTRACT

Systems and methods for assisting automatic speech recognition (ASR) are provided. An example system includes a buffer operable to store sensor data. The sensor data includes an acoustic signal, the acoustic signal representing at least one captured sound. The system includes a processor communicatively coupled to the buffer and being operable to store received sensor data in the buffer. The received sensor data is analyzed to produce new parameters associated with the sensor data. The buffered sensor data is processed based at least on the new parameters. The processing may include separating clean voice from noise in the acoustic signal. The processor is further operable to provide at least the processed sensor data (for example, the clean voice) to an ASR system operable to receive and process the processed sensor data at a speed faster than real time. The new parameters may also be provided to the ASR system.

18 Claims, 6 Drawing Sheets

(56) References Cited

U.S. PATENT DOCUMENTS

| | | | |
|---|---|---|---|
| 5,340,316 A | 8/1994 | Javkin et al. |
| 5,640,490 A | 6/1997 | Hansen et al. |
| 5,787,414 A | 7/1998 | Miike et al. |
| 6,018,708 A | 1/2000 | Dahan et al. |
| 6,067,517 A | 5/2000 | Bahl et al. |
| 6,757,652 B1 | 6/2004 | Lund et al. |
| 6,954,745 B2 | 10/2005 | Rajan |
| 7,016,836 B1 | 3/2006 | Yoda |
| 7,219,063 B2 | 5/2007 | Schalk et al. |
| 7,319,959 B1 | 1/2008 | Watts |
| 7,698,133 B2 | 4/2010 | Ichikawa |
| 8,194,880 B2 | 6/2012 | Avendano |
| 8,275,616 B2 | 9/2012 | Jung et al. |
| 8,345,890 B2 | 1/2013 | Avendano et al. |
| 8,355,511 B2 | 1/2013 | Klein |
| 8,405,532 B1 | 3/2013 | Clark et al. |
| 8,447,596 B2 | 5/2013 | Avendano et al. |
| 8,473,287 B2 | 6/2013 | Every et al. |
| 8,538,035 B2 | 9/2013 | Every et al. |
| 8,543,399 B2 | 9/2013 | Jeong et al. |
| 8,712,776 B2 | 4/2014 | Bellegarda et al. |
| 8,718,299 B2 | 5/2014 | Nishimura et al. |
| 8,880,396 B1 | 11/2014 | Laroche et al. |
| 8,903,721 B1 | 12/2014 | Cowan |
| 8,938,394 B1 | 1/2015 | Faaborg et al. |
| 9,143,851 B2 | 9/2015 | Schober |
| 9,185,487 B2 | 11/2015 | Solbach et al. |
| 9,240,182 B2 | 1/2016 | Lee et al. |
| 2002/0036624 A1 | 3/2002 | Ohta et al. |
| 2002/0041678 A1 | 4/2002 | Basburg-Ertem et al. |
| 2002/0097884 A1 | 7/2002 | Cairns |
| 2002/0138265 A1 | 9/2002 | Stevens et al. |
| 2003/0069727 A1 | 4/2003 | Krasny et al. |
| 2003/0161097 A1 | 8/2003 | Le et al. |
| 2003/0179888 A1 | 9/2003 | Burnett et al. |
| 2004/0029622 A1 | 2/2004 | Laroia et al. |
| 2004/0076190 A1 | 4/2004 | Goel et al. |
| 2004/0114772 A1 | 6/2004 | Zlotnick |
| 2005/0060155 A1 | 3/2005 | Chu et al. |
| 2005/0159945 A1 | 7/2005 | Otsuka et al. |
| 2005/0171851 A1 | 8/2005 | Applebaum et al. |
| 2006/0074658 A1 | 4/2006 | Chadha |
| 2006/0074686 A1 | 4/2006 | Vignoli |
| 2006/0092918 A1 | 5/2006 | Talalai |
| 2006/0100876 A1 | 5/2006 | Nishizaki et al. |
| 2007/0064817 A1 | 3/2007 | Dunne et al. |
| 2007/0073536 A1 | 3/2007 | Clark et al. |
| 2007/0081636 A1 | 4/2007 | Shaffer et al. |
| 2007/0154031 A1 | 7/2007 | Avendano et al. |
| 2007/0256027 A1 | 11/2007 | Daude |
| 2007/0262863 A1 | 11/2007 | Aritsuka et al. |
| 2008/0004875 A1 | 1/2008 | Chengalvarayan et al. |
| 2008/0010057 A1 | 1/2008 | Chengalvarayan et al. |
| 2008/0019548 A1 | 1/2008 | Avendano |
| 2008/0071547 A1 | 3/2008 | Prieto et al. |
| 2008/0140479 A1 | 6/2008 | Mello et al. |
| 2008/0157129 A1 | 7/2008 | Hsu et al. |
| 2008/0195389 A1 | 8/2008 | Zhang et al. |
| 2009/0024392 A1 | 1/2009 | Koshinaka |
| 2009/0083034 A1 | 3/2009 | Hernandez et al. |
| 2009/0125311 A1 | 5/2009 | Haulick et al. |
| 2009/0146848 A1 | 6/2009 | Ghassabian |
| 2009/0192795 A1 | 7/2009 | Cech |
| 2009/0220107 A1 | 9/2009 | Every et al. |
| 2009/0235312 A1 | 9/2009 | Morad et al. |
| 2009/0238373 A1 | 9/2009 | Klein |
| 2009/0254351 A1 | 10/2009 | Shin et al. |
| 2009/0270141 A1 | 10/2009 | Sassi |
| 2009/0323982 A1 | 12/2009 | Solbach et al. |
| 2010/0082346 A1 | 4/2010 | Rogers et al. |
| 2010/0082349 A1 | 4/2010 | Bellegarda et al. |
| 2010/0121629 A1 | 5/2010 | Cohen |
| 2010/0204987 A1 | 8/2010 | Miyauchi |
| 2010/0305807 A1 | 12/2010 | Basir et al. |
| 2010/0312547 A1 | 12/2010 | Van Os et al. |
| 2010/0324894 A1 | 12/2010 | Potkonjak |
| 2011/0029359 A1 | 2/2011 | Roeding et al. |
| 2011/0145000 A1 | 6/2011 | Hoepken et al. |
| 2011/0218805 A1 | 9/2011 | Washio et al. |
| 2011/0255709 A1 | 10/2011 | Nishimura et al. |
| 2011/0257967 A1 | 10/2011 | Every et al. |
| 2011/0275348 A1 | 11/2011 | Clark et al. |
| 2011/0293102 A1 | 12/2011 | Kitazawa et al. |
| 2011/0293103 A1 | 12/2011 | Park et al. |
| 2012/0010881 A1 | 1/2012 | Avendano et al. |
| 2012/0027218 A1 | 2/2012 | Every et al. |
| 2012/0166184 A1 | 6/2012 | Locker et al. |
| 2012/0224456 A1 | 9/2012 | Visser et al. |
| 2013/0097437 A9 | 4/2013 | Naveh et al. |
| 2013/0211828 A1 | 8/2013 | Gratke et al. |
| 2013/0260727 A1 | 10/2013 | Knudson et al. |
| 2013/0332156 A1 | 12/2013 | Tackin et al. |
| 2014/0006825 A1 | 1/2014 | Shenhav |
| 2014/0025379 A1 | 1/2014 | Ganapathiraju et al. |
| 2014/0114665 A1 | 4/2014 | Murgia |
| 2014/0244273 A1* | 8/2014 | Laroche .............. G06F 1/3206 704/275 |
| 2014/0274203 A1 | 9/2014 | Ganong et al. |
| 2014/0278435 A1 | 9/2014 | Ganong et al. |
| 2014/0316783 A1 | 10/2014 | Medina |
| 2014/0348345 A1 | 11/2014 | Furst et al. |
| 2015/0031416 A1 | 1/2015 | Labowicz et al. |
| 2015/0193841 A1 | 7/2015 | Bernard |
| 2016/0077574 A1 | 3/2016 | Bansal et al. |

FOREIGN PATENT DOCUMENTS

| | | |
|---|---|---|
| KR | 1020150121038 | 10/2015 |
| WO | WO2013150325 A1 | 10/2013 |
| WO | WO2014063104 A2 | 4/2014 |
| WO | WO2014134216 A1 | 9/2014 |
| WO | WO2014172167 A1 | 10/2014 |
| WO | WO2015103606 A1 | 7/2015 |

OTHER PUBLICATIONS

International Search Report & Written Opinion dated May 1, 2015 in Patent Cooperation Treaty Application No. PCT/US2015/010312, filed Jan. 6, 2015, 12 pp.

International Search Report & Written Opinion dated Apr. 29, 2014 in Patent Cooperation Treaty Application No. PCT/US2013/065765, filed Oct. 18, 2013.

International Search Report & Written Opinion dated Sep. 11, 2014 in Patent Cooperation Treaty Application No. PCT/US2014/033559, filed Apr. 9, 2014.

Hinton, G. et al., "Deep Neural Networks for Acoustic Modeling in Speech Recognition", IEEE Signal Processing Magazine, Nov. 2012, pp. 82-97.

Laroche, Jean et al., "Noise Suppression Assisted Automatic Speech Recognition", U.S. Appl. No. 12/962,519, filed Dec. 7, 2010.

Medina, Eitan Asher, "Cloud-Based Speech and Noise Processing", U.S. Appl. No. 61/826,915, filed May 23, 2013.

Laroche, Jean et al., "Adapting a Text-Derived Model for Voice Sensing and Keyword Detection", U.S. Appl. No. 61/836,977, filed Jun. 19, 2013.

Santos, Peter et al., "Voice Sensing and Keyword Analysis", U.S. Appl. No. 61/826,900, filed May 23, 2013.

Murgia, Carlo, "Continuous Voice Sensing", U.S. Appl. No. 61/881,868, filed Sep. 24, 2013.

* cited by examiner

BUFFERED REPROCESSING FOR MULTI-MICROPHONE AUTOMATIC SPEECH RECOGNITION ASSIST

CROSS-REFERENCE TO RELATED APPLICATION

The present application claims the benefit of U.S. Provisional Application No. 61/971,793, filed on Mar. 28, 2014. The subject matter of the aforementioned application is incorporated herein by reference for all purposes.

FIELD

The present application relates generally to audio signal processing, and more specifically to systems and methods for assisting automatic speech recognition.

BACKGROUND

Speech recognition servers can receive and recognize voice input. Typically, speech recognition servers reside in a cloud-based computing resource and receive the input sent to them over a wired and/or wireless network(s) in real-time. Some mobile devices may have the user press a button to signal the mobile device to activate speech recognition. After the speech recognition is activated, the user can speak to the device. Various mobile devices allow the user to use a wakeup keyword to activate the speech recognition (e.g., "ok Google") on the mobile device. In response to a command uttered by the user (e.g., "when is the next 49ers game?"), the user can expect a quick response.

Users sometimes have to utter commands in noisy conditions, such as when there are other voices in the background. In such conditions, the speech recognition (SR) engine may receive the microphone input that includes speech from both the speaker (the user), as well as speech from other speakers speaking in the background. Accordingly, the SR engine may not recognize the speech of the speaker accurately.

In particular, an issue may arise with some pre-processing algorithms using multiple microphones and taking time to adjust parameters to optimal values when a voice comes from a new direction. This can occur, for example, when a user changes his/her position relative to the device (for example, the user moves to a different part of a room relative to a tablet or a TV set, or changes his/her hand orientation while holding a cellphone). When a talker (speaker) first speaks from the new position, the processor/algorithm can adapt many of its internal parameters to account for this (for example, direction of arrival estimate, either explicitly or implicitly, noise estimates) and then settle on optimal parameters for the new orientation. During this transitional time, however, the processing is not optimal and may even degrade the speech signal. Thus, the beginning of the utterance can be distorted or, at best, the speech can be processed with less noise removed until the processor/algorithm settles on the optimal parameters.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

According to an aspect of the present disclosure, a system for assisting automatic speech recognition (ASR) is provided. According to an example embodiment, the system includes a buffer operable to receive sensor data. The sensor data can include at least one acoustic signal. The system may include a processor communicatively coupled to the buffer. The processor can be operable to store received sensor data in the buffer (creating stored sensor data, also referred to as buffered sensor data). In some embodiments, the processor is operable to analyze the received sensor data to produce new parameters associated with the sensor data. The processor may be further operable to process the stored/buffered sensor data based at least on the new parameters and provide at least the processed sensor data to an ASR system.

In some embodiments, the ASR system is operable to further process the processed sensor data at a speed faster than real time.

In various embodiments, the processor is further operable to replace the sensor data in the buffer with the next portion of the sensor data.

In some embodiments, the processor is further operable to provide the new parameters to an ASR system that is configured to analyze the processed sensor data based at least in part on the new parameters. In response to receiving a notification from the ASR system, the processor is further operable to send the sensor data to the ASR system for further processing based at least in part on the new parameters.

In some embodiments, the ASR system is located remotely. The processor can be communicatively coupled to the ASR system via a high-speed network.

According to various embodiments, the new parameters include one or more of the following: inter-microphone energy level differences, inter-microphone phase differences, acoustic signal energy, estimated pitch, and estimated saliency of the pitch.

In certain embodiments, processing the sensor data includes separating a clean voice from noise in the acoustic signal and providing the processed sensor data, including the clean voice. The separating may include performing at least one of the following: noise suppression and noise reduction.

In some embodiments, the analyzing the sensor data includes determining a direction of arrival of the acoustic signal. According to various embodiments, the sensor data are provided by one or more of the following: a sound sensor configured to capture the at least one acoustic signal, a motion sensor, an environment sensor, a radio sensor, and a light sensor.

According to another aspect of the present technology, a method for assisting automatic speech recognition is provided. An example method includes receiving sensor data. The sensor data may include at least one acoustic signal. The method includes storing the sensor data in a buffer, according to exemplary embodiments. The method can allow processing the sensor data to produce new parameters. The method can include processing the sensor data based at least in part on the new parameters and providing the processed sensor data to an ASR system. In certain embodiments, the ASR system is operable to receive and further process the processed sensor data at a speed faster than real time.

According to another example embodiment of the present disclosure, the steps of the method for assisting automatic speech recognition are stored on a machine-readable medium comprising instructions, which, when implemented by one or more processors, perform the recited steps.

Other example embodiments of the disclosure and aspects will become apparent from the following description taken in conjunction with the following drawings.

BRIEF DESCRIPTION OF THE DRAWINGS

Embodiments are illustrated by way of example and not limitation in the figures of the accompanying drawings, in which like references indicate similar elements.

DETAILED DESCRIPTION

The present disclosure provides exemplary systems and methods for assisting automatic speech recognition. Embodiments of the present disclosure can be practiced on any mobile device configured to receive and/or provide audio, by way of example and not limitation, a media player, personal digital assistant, mobile telephone, smart phone, phablet, tablet computer, netbook computer, notebook computer, hand-held computing system, wearable computing system, other mobile computing system, and the like.

Mobile devices can include: radio frequency (RF) receivers, transmitters, and transceivers; wired and/or wireless telecommunications and/or networking devices; amplifiers; audio and/or video players; encoders; decoders; speakers; inputs; outputs; storage devices; user input devices. Mobile devices may include inputs such as buttons, switches, keys, keyboards, trackballs, sliders, touch screens, one or more microphones, gyroscopes, accelerometers, global positioning system (GPS) receivers, and the like. Mobile devices can include outputs, such as LED indicators, video displays, touchscreens, speakers, and the like. In some embodiments, mobile devices are hand-held devices, such as wired and/or wireless remote controls, notebook computers, tablet computers, phablets, smart phones, personal digital assistants, media players, mobile telephones, and the like. In other embodiments, mobile devices are wearable devices, such as smart watches, glasses, and the like.

According to exemplary embodiments, a method for assisting automatic speech recognition includes receiving sensor data. The sensor data may include at least one acoustic signal. The method can include storing the sensor data in a buffer. The method can further allow processing the sensor data to produce new parameters. The method includes processing the sensor data based at least in part on the new parameters and providing the processed sensor data to an ASR system, according to some embodiments. The ASR system may be operable to receive and process the processed sensor data at a speed faster than real-time.

Figure 1:
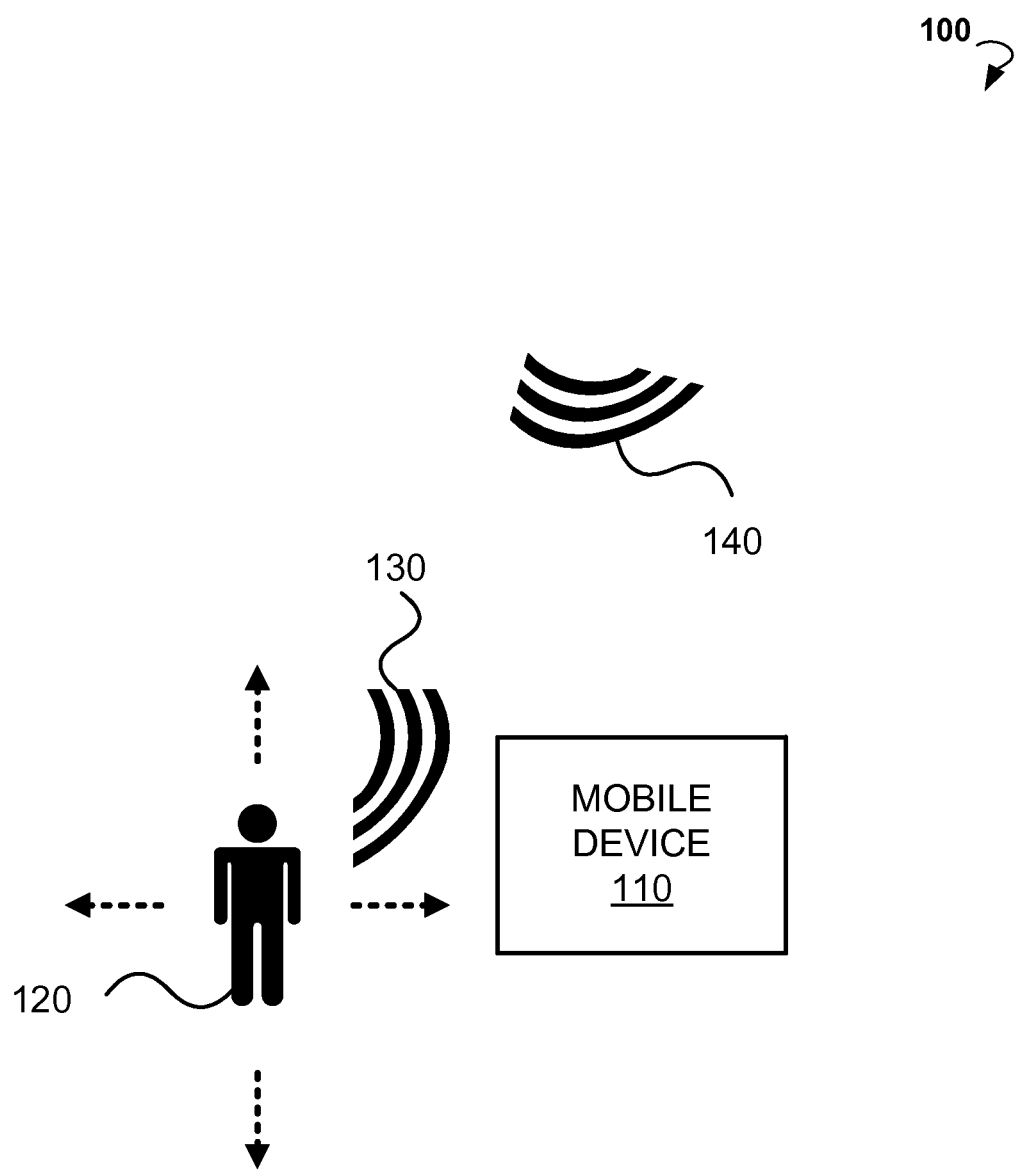
FIG. 1 is a block diagram showing an example acoustic environment, according to some embodiments.

FIG. 1 depicts a simplified diagram of an acoustic environment 100, according to some embodiments. Acoustic environment 100 includes mobile device 110 operated by user 120. User 120 may change position relative to mobile device 110. For example, user 120 moves his/her person, turns his/her head and/or hand which holds mobile device 110, and the like. User 120 provides speech 130, for example, by saying one or more voice commands. Acoustic environment 100 can include ambient noise 140. Ambient noise 140 includes, for example, one or more of other people speaking, animal noises (for example, barking, growling, chirping, and so on), noise from machines (for example, music players, cars, helicopters, airplanes, fans, heating, ventilation, and air conditioning (HVAC) systems, and the like). Although ambient noise 140 is depicted as a single source in one position, ambient noise 140 can be multiple sources disposed at various different positions.

Figure 2A:
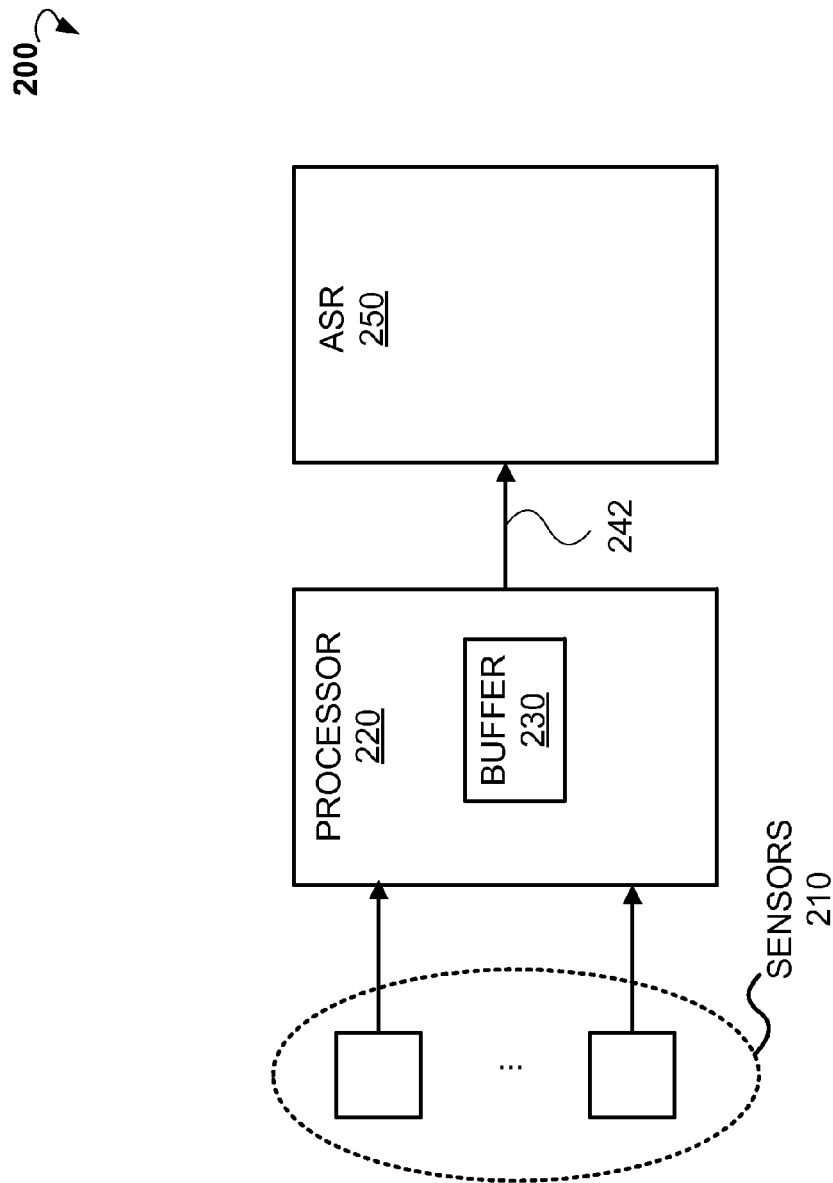
FIG. 2A is a block diagram showing components of a system for assisting automatic speech recognition, according to an example embodiment.
Figure 2B:
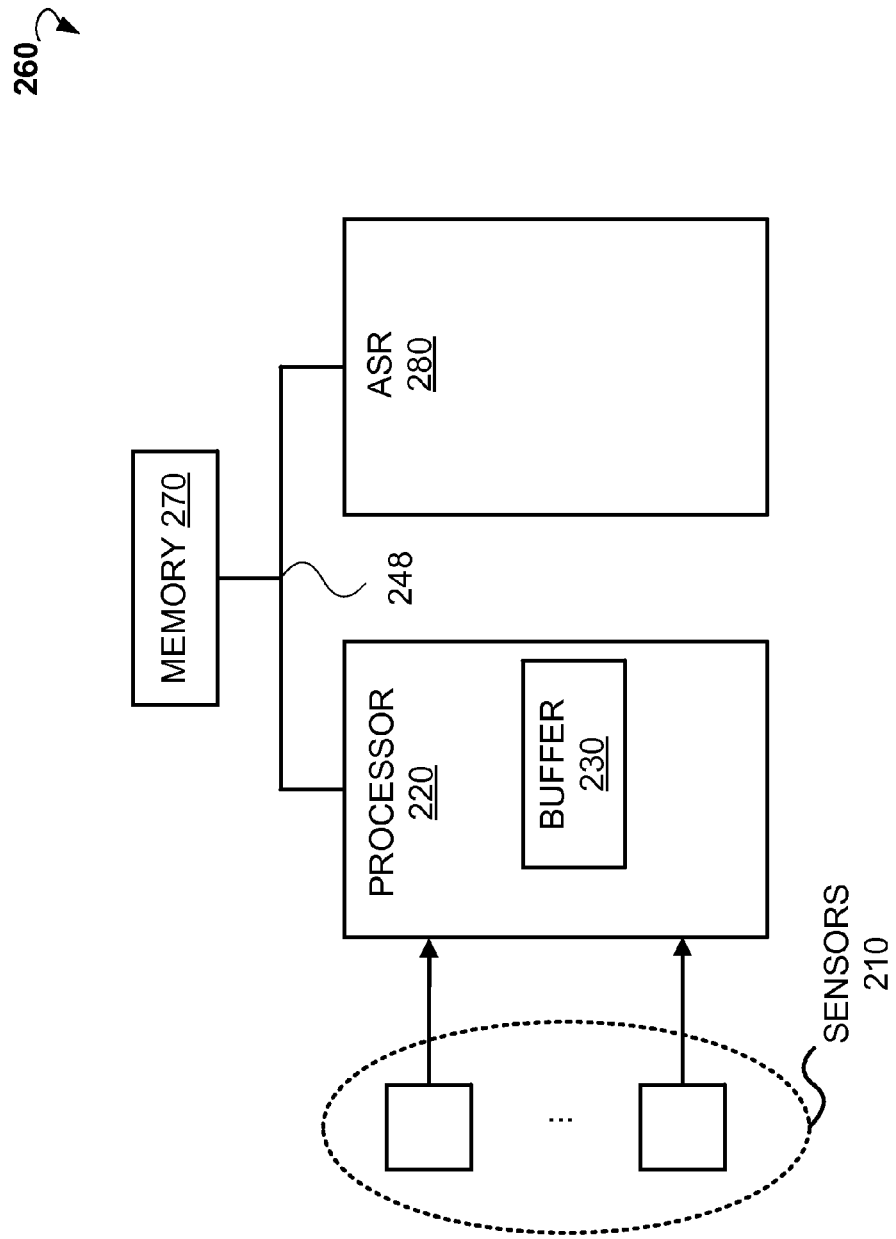
FIG. 2B is a block diagram showing components of a system for assisting automatic speech recognition, according to an example embodiment.

FIGS. 2A and 2B illustrate simplified block diagrams of systems 200 and 260 (respectively), according to some embodiments. Systems 200 and 260 include one or more sensors 210, processor 220, buffer 230, and automatic speech recognition (ASR) 250 and 280, respectively. The system 260 includes a memory 270.

One or more sensors 210 may include acoustic and/or non-acoustic sensor(s) and in that regard may be at least one of a sound sensor, motion and/or orientation (inertial) sensor, environmental sensor, radio, and the like. Sound sensors include, for example, transducers, such as acoustic-to-electric transducers (for example, microphones) that convert sound into an electrical signal. Sound sensors can sense speech, music, ambient sounds, and the like in acoustic environment 100 (FIG. 1).

Motion and/or orientation (inertial) sensors include, for example, magnetometers, accelerometers, gyroscopes, and the like. A magnetometer, such as a compass, measures the strength and/or direction of a magnetic field, in order to determine a direction in a frame of reference (for example, north, south, east, and west). Accelerometers measure acceleration along one or more axes, where the axes are, for example, mutually perpendicular to each other. Gyroscopes (for example, micro-electro-mechanical systems (MEMS) gyroscopes) measure rotational movement.

Environmental sensors include, for example, thermometers (that measure an ambient temperature and/or temperature gradient), hygrometers (that measure humidity), pressure sensors (that measure an altitude), and photosensors and photodetectors (for example, cameras, ambient light sensors, and infrared (IR) sensors). Cameras are, for example, charge-coupled device (CCD) image sensors, active-pixel sensor (APS), and the like. Ambient light sensors are, for example, photodiodes, photoresistors, phototransistors, and the like. IR detectors may be thermal and/or photonic (for example, photodiodes).

Radios include, for example, Global Positioning System (GPS) receivers, mobile telephone radios, Wi-Fi devices, Bluetooth radios, and the like. Mobile telephone radios are associated with one or more mobile phone cellular networks. Wi-Fi devices, for example, are based on Institute of Electrical and Electronics Engineers (IEEE) 802.11 standards. Bluetooth radios, for example, correspond to Bluetooth standards overseen by the Bluetooth Special Interest Group (SIG).

Although various sensors/emitters are described in relation to FIGS. 2A and 2B, different combinations and permutations of types of sensors are possible, according to some embodiments.

Processor 220 carries out the instructions of a computer program, for example, by performing arithmetical, logical, and input/output operations. Processor 220 is illustrated by processor 510 and described further in relation to FIG. 5. For example, processor 220 is a digital signal processor (DSP). In some exemplary embodiments, processor 220 is optimized for noise suppression. Processor 220, for example, reduces ambient noise 140 (FIG. 1) in the audio signal sensed by one or more sensors 210, such that a signal that substantially includes speech 130 (and not ambient noise 140) is provided to ASR 250 and/or 280.

Buffer 230 buffers/stores sensor data received from one or more sensors 210. Buffer 230 may, for example, be one or more of static random access memory (SRAM), First In First Out (FIFO) memory, one or more delay elements, one or more shift registers, and the like. Although depicted as integrated in processor 220, buffer 230 may alternatively be external to processor 220.

ASR 250 and 280 translate (a representation of) spoken words into text, for example, to provide a user voice interface. ASR 250 may be external to mobile device 110 (for example, in cloud-based computing resources (the "cloud")) as illustrated by FIG. 2A and/or ASR 280 may be included in mobile device 110 (FIG. 1) as illustrated in FIG. 2B. In some embodiments, including both ASR 250 and ASR 280, ASR 250 has a larger vocabulary of recognized words/phrases and consumes higher power, and ASR 280 has a smaller vocabulary of recognized words/phrases and consumes lower power.

In FIG. 2A, processor 220 provides a noise-reduced representation of speech 130 (FIG. 1) to ASR 250 over connection 242. Connection 242, for example, includes wired and/or wireless communications between processor 220 and ASR 250.

In FIG. 2B, one or more busses 248 communicatively couple at least one of processor 220 to ASR 280, processor 220 to memory 270, and memory 270 to ASR 280. One or more busses 248 is illustrated by bus 590 and described further in relation to FIG. 5. Memory 270 is illustrated by main memory 520 in and described further in relation to FIG. 5.

In some embodiments, processor 220 provides the noise-reduced representation of speech from user 120 to ASR 280 (FIG. 2B) over bus 248. In various embodiments, processor 220 writes the noise-reduced representation of speech in memory 270 and ASR 280 reads the noise-reduced representation of speech from memory 270.

Figure 3:
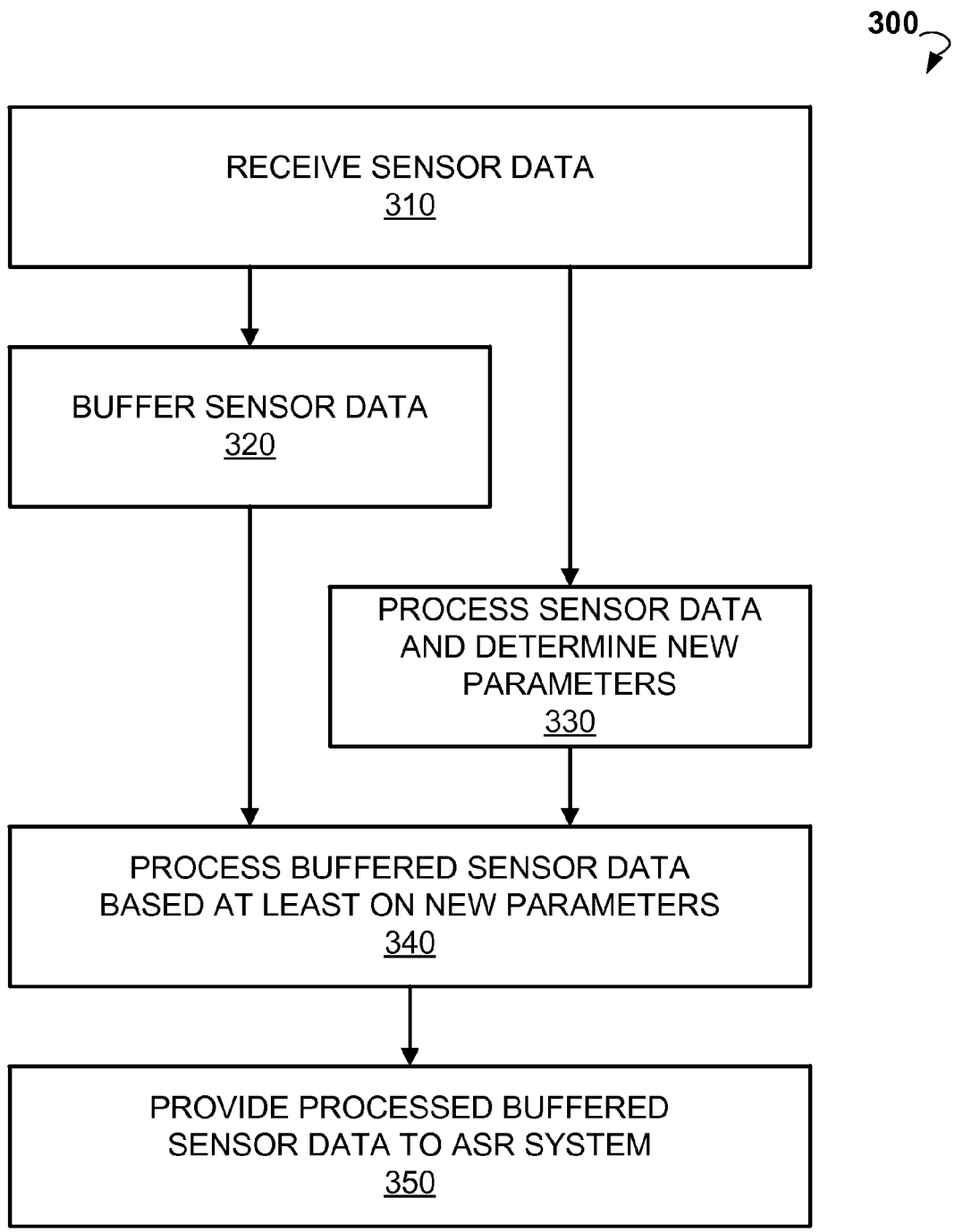
FIG. 3 is a flowchart showing steps of an exemplary method for assisting automatic speech recognition.

FIG. 3 illustrates a simplified block diagram of a method 300 for buffering and processing sensor data. In block 310, sensor data (for example, from one or more sensors 210 in FIGS. 2A and/or 2B) is received. For example, an audio signal(s) having desired speech (for example, speech 130 from user 120 in FIG. 1) and noise (ambient noise 140 in FIG. 1) is received from one or more sensors 210 (FIG. 2), such as microphone(s).

In block 320, the received sensor data is buffered (for example, stored in buffer 230 in FIGS. 2A and 2B).

In block 330, the received sensor data is processed (for example, by processor 220 in FIGS. 2A and 2B) based in part on initial processing parameters. The processing determines new processing parameters.

In block 340, the buffered sensor data is processed (for example, by processor 220 in FIGS. 2A and 2B) based in part on the new processing parameters. The processing reduces that amount of ambient noise 140 (FIG. 1) in the buffered sensor data such that a noise-reduced signal substantially includes speech 130 from user 120 (and not ambient noise 140).

In block 350, (a representation of) the noise-reduced signal is provided to ASR 250 and/or 280 (FIG. 2). In some preferred embodiments, the noise-reduced signal is provided at high speed and/or high bandwidth.

An Example Embodiment

An automatic speech recognition assistance (ASRA) in mobile devices performs noise suppression to detect features in the incoming microphone input in real-time, concurrently passing the stream at a real-time rate to the SR engine. A constraint on such ASRA is that ASRA determines what is noise and what is real user input ("future input"), based on the past and present data that comes from the microphone. ASRA cannot use the future input from the user to perform noise suppression (while passing the "cleaned" microphone input to the server), because ASRA passes "cleaned" microphone input in real-time to the server, and therefore cannot use this future input to produce the input passed in real-time.

Some embodiments include, for example, a device having one or more microphones and a digital signal processor (DSP) (or other processor) with memory, and a high-speed interface to a speech recognition server (the interface is optionally capable of bursting microphone input at a speed that is typically faster than real-time speed). The speech recognition resides in the network (for example, in the cloud), or integrated on the device and running on the same or an additional processor.

In response to the processor (for example, DSP) processing spoken user commands (for example, after a trigger is identified that signifies the user wants to interact with an SR engine, the trigger preceded by a few seconds by a spoken command that the SR engine should process), the processor will buffer a certain amount of time (for example, up to a few seconds) of microphone(s) input, and analyze the input to train its algorithm to recognize features of the input. In this way, the processor can apply the algorithm to improve ASRA processing, apply the algorithm using updated features to the original input, and provide "cleaned" output to the SR engine. By way of example and not limitation, the processor (ASRA algorithm) can train itself on the voice of the real user after processing some amount of time (such as a few seconds) of the microphone input, and then apply a better mask to the voice distractors starting from the beginning of the recording.

In order to make up the "lost time" in passing the microphone data to the SR engine, it will then burst buffer the accumulated "cleaned" output to the SR server over a fast network interface and continue to clean the microphone data in real time as the user speaks, after the initial buffered microphone data is processed (for example, beyond the few seconds of data stored in the buffer).

The above steps may be performed while the user is speaking to the device and the latency that was accumulated is transparent to the user, because the SR engine can process the clean microphone input faster than real-time speeds.

In some embodiments, the SR engine is, for example, an embedded engine that resides on the (mobile) device (rather than in the cloud), and may be implemented on the main processor, so the DSP can provide the processed data to a shared memory on the (mobile) device, that is accessible by the main processor. In this case, the DSP can notify the SR engine when to start processing the input (for example, after the buffering, training and processing is done) and bursting (explained above) does not necessarily occur over the network, but can simply be local to the device and implemented by the SR engine processing the cleaned input buffer from the shared memory at faster than real-time speeds.

Various embodiments of the present technology are extensible to more than one microphone, and to buffering input from sensors in addition to the microphones, to be used by ASRA processes that employ a buffer of the sensors' input. Buffering by a DSP of multiple inputs is important; because algorithms could benefit from an insight in the future (by nature of this buffered input). ASRA could then infer contextual information from multiple sensors that could be applied to the original input (where microphone is one type of input sensor). So, input from multiple microphones, as well as multiple motion sensors, can be buffered. A benefit is that typically the mobile device has a larger connectivity set, so the ASRA can make better decisions with this insight. In addition, the SR engine can operate with only one input, thereby increasing the importance of feeding it with as clean of an input as possible.

According to some embodiments, sensors include any of microphones, motions sensors, heat sensors, light sensors, and even radio sensors.

One of the benefits provided by embodiments of the present technology (for example, buffering sensor inputs in mobile devices, and processing the buffered inputs with SR assistance algorithms to provide insight into the future, and then processing the buffered input before sending it to the SR engine) is the SR engine has only one input. So cleaning this input, and doing it such that the latency accumulated by the buffering is hidden from the end user, is critical to the end-user experience. In addition, better accuracy from the SR engine will result. Since the SR engine can "pump" the data from the buffer much faster than real time, there is no discernable latency added to the user experience in getting a response after he/she finished saying the command.

In various embodiments, a user will wake up a mobile device (for example, smartphone, tablet, computer, or any other consumer electronic device) with a trigger (for example, a voice command, other sensor input, and combinations thereof) and then speak a verbal command/question. The processor (for example, DSP) may be tasked with both detecting the trigger, as well as buffering the microphones and/or sensor input that can start before the main processors are fully powered up. The buffered input of the command should be processed by the DSP, before the main processor is even able to send the entire command to the SR engine. Various embodiments use buffering so processing may train itself, look into the "future" and clean the buffered data, and then start passing the "cleaned" output to the SR engine in a burst as soon as the main processor has woken up and established a link to the SR engine.

Another Example Embodiment

Some embodiments provide a method for improving the performance of multi-microphone noise reduction for speech recognition.

For the voice signal processing chain, there can be tight latency constraints that have to be achieved which restrict the amount of buffering or reprocessing that can be done. However, for speech recognition, the latency constraints are different. The user is interested in the amount of time after the end of an utterance that the recognition result comes back. This allows for flexibility to buffer and reprocess the incoming speech. So, some embodiments process the incoming speech and at the same time buffer the microphone streams. Once the adaptive parameters have settled to their optimal values (for example, determined either by a fixed amount of time or by internal measures within the algorithm) then the processor/algorithm can go back and start processing the streams from the beginning. By doing so in this example, the initial part of the utterance now gets processed by the algorithm with its best parameter settings.

For example:
the processor/algorithm can determine the direction of arrival of the new speech (implicit or explicit) and then go back and reprocess the start of the utterance again; and/or noise estimates may be updated as the directional pattern of the multi-microphone array adjusts to the new direction of the talker. Once the new noise estimate is determined, the new algorithm can then go back to the start of the utterance and reprocess it with this improved noise estimate.

the processor/algorithm may, after some time, make a classification of the input (perhaps from several directions) as being from the desired talker and then go back and reprocess the start of the utterance in the best way for the direction the desired talker is in relative to background or other interfering directional noises.

In this way, in this example, the beginning part of the utterance is processed using the algorithm's best parameter settings and is no longer damaged during the period of parameter adaptation.

For speech recognition applications, there is the flexibility to go back and reprocess the utterance because there is no constraint to produce an output in real-time. Nevertheless, there may be constraints to the length of the buffer so that the total response time of the system, including the recognizer itself does not become too long. By using a processor that runs the algorithm faster than real-time, it is possible to catch up the reprocessing of the buffered speech so the latency impact of the reprocessing on the overall system responsiveness can be minimized, according to some embodiments.

Many multi-microphone processing techniques have been focused on noise reduction for the voice channel. In some situations, the flexibility to do this buffered reprocessing does not exist because of the latency and real-time constraints. Different latency requirements for speech recognition, for example, make the various approaches of the present technology to buffered reprocessing feasible.

Figure 4:
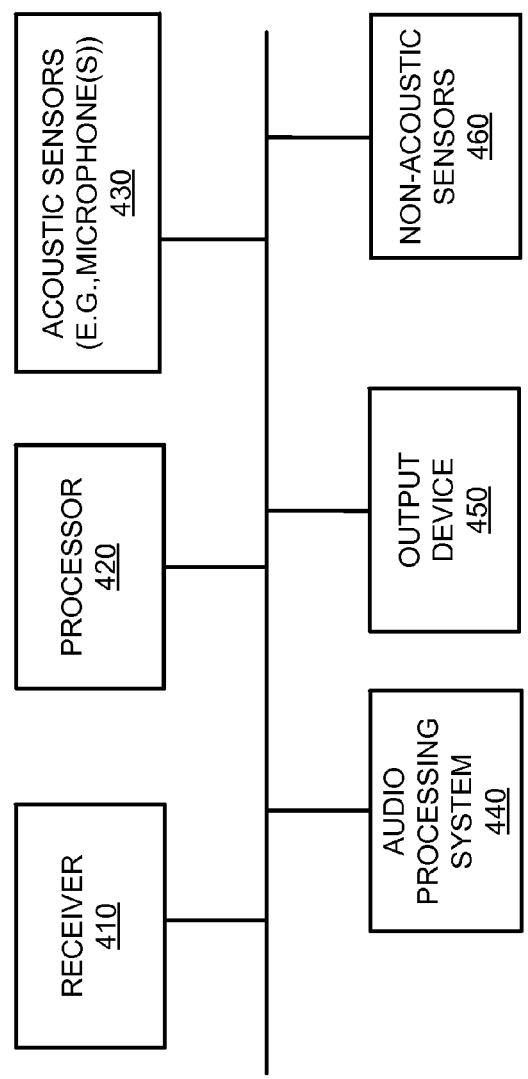
FIG. 4 is a block diagram showing a mobile device that can implement a method for assisting automatic speech recognition, according to an example embodiment.

FIG. 4 shows an exemplary system suitable for implementing methods for the various embodiments described herein. In an exemplary embodiment, the system 400 may comprise a receiver 410, a processor 420, one or more acoustic sensors (e.g., microphone(s)) 430, an audio processing system 440, an output device 450, and one or more non-acoustic sensors 460. The system 400 may comprise more or other components to provide a particular operation or functionality. Similarly, the system 400 may comprise fewer components that perform similar or equivalent functions to those depicted in FIG. 4. In addition, elements of system 400 may be cloud-based, including but not limited to the processor 420.

The receiver 410 can be configured to communicate with a network such as the Internet, Wide Area Network (WAN), Local Area Network (LAN), cellular network, and so forth, to receive an audio data stream, which may comprise one or more channels of audio data. The received audio data stream may then be forwarded to the audio processing system 440 and the output device 450.

The processor 420 may include hardware and software that implement the processing of audio data and various other operations depending on a type of the system 400 (for example, communication device and computer). A memory (for example, non-transitory computer readable storage medium) may store, at least in part, instructions and data for execution by processor 420.

The audio processing system 440 may include hardware and software that implement the methods according to various embodiments disclosed herein. The audio processing system 440 is further configured to receive acoustic signals from an acoustic source via acoustic sensors (e.g., microphone(s)) 430 and process the acoustic signals. After reception by the acoustic sensors (e.g., microphone(s)) 430, the acoustic signals may be converted into electric signals by an analog-to-digital converter.

In some embodiments, the acoustic sensors (e.g., microphone(s)) 430 are spaced a distance apart (for example, at top and bottom of the mobile device 110 (FIG. 1)) such that the acoustic waves impinging on the device from certain directions exhibit different energy levels at the two or more microphones. In other embodiments, where the acoustic sensors 430 are omni-directional microphones that are closely spaced (for example, 1-2 cm apart), a beamforming technique can be used to simulate a forward-facing and backward-facing directional microphone response. Although acoustic sensors, such as 430, are described herein in certain examples as microphones, other suitable acoustic sensors may be used in various embodiments. A level difference can be obtained using the simulated forward-facing and backward-facing directional microphone. The level difference can be used to discriminate speech and noise in, for example, the time-frequency domain, which can be used in noise and/or echo reduction. In some embodiments, some microphones are used mainly to detect speech and other microphones are used mainly to detect noise. In various embodiments, some microphones are used to detect both noise and speech.

In some embodiments, the audio processing system 440 is configured to carry out noise suppression and/or noise reduction based on inter-microphone level difference, level salience, pitch salience, signal type classification, speaker identification, and so forth. An example audio processing system suitable for performing noise reduction is discussed in more detail in U.S. patent application Ser. No. 12/832,901, titled "Method for Jointly Optimizing Noise Reduction and Voice Quality in a Mono or Multi-Microphone System," filed on Jul. 8, 2010, now U.S. Pat. No. 8,473,287, issued Jun. 25, 2013, the disclosure of which is incorporated herein by reference for all purposes. By way of example and not limitation, noise reduction methods are described in U.S. patent application Ser. No. 12/215,980, entitled "System and Method for Providing Noise Suppression Utilizing Null Processing Noise Subtraction," filed Jun. 30, 2008, and in U.S. patent application Ser. No. 11/699,732, entitled "System and Method for Utilizing Omni-Directional Microphones for Speech Enhancement," filed Jan. 29, 2007, now U.S. Pat. No. 8,194,880, issued Jun. 5, 2012, which are incorporated herein by reference in their entireties.

The output device 450 is any device that provides an audio output to a listener (for example, the acoustic source). For example, the output device 450 may comprise a speaker, a class-D output, an earpiece of a headset, or a handset on the system 400.

Figure 5:
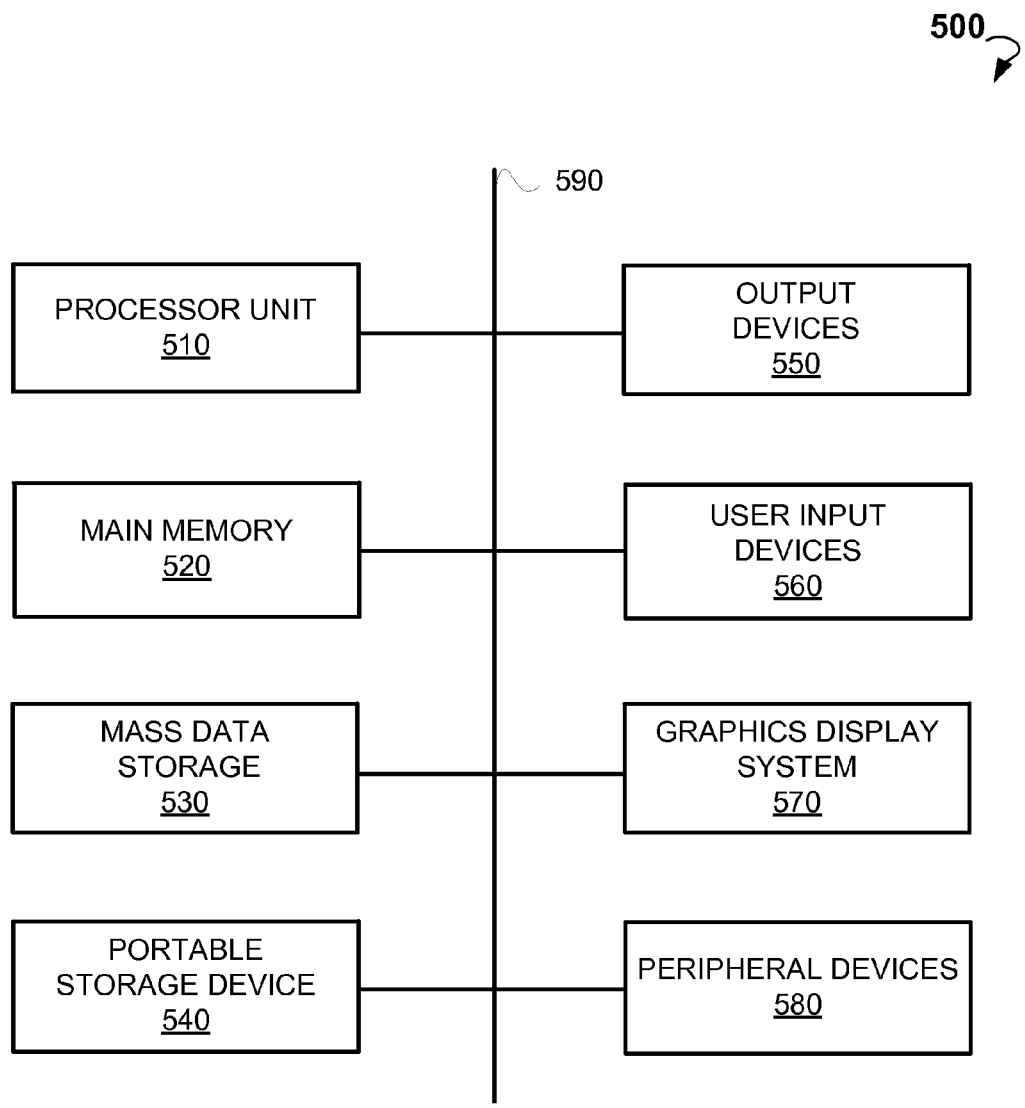
FIG. 5 is a block diagram of an exemplary computer system that may be used to implement embodiments of the present disclosure.

FIG. 5 illustrates an exemplary computer system 500 that may be used to implement some embodiments of the present invention. The computer system 500 of FIG. 5 may be implemented in the contexts of the likes of computing systems, networks, servers, or combinations thereof. The computer system 500 of FIG. 5 includes one or more processor unit(s) 510 and main memory 520. Main memory 520 stores, in part, instructions and data for execution by processor unit(s) 510. Main memory 520 stores the executable code when in operation, in this example. The computer system 500 of FIG. 5 further includes a mass data storage 530, portable storage device 540, output devices 550, user input devices 560, a graphics display system 570, and peripheral devices 580.

The components shown in FIG. 5 are depicted as being connected via a single bus 590. The components may be connected through one or more data transport means. Processor unit(s) 510 and main memory 520 is connected via a local microprocessor bus, and the mass data storage 530, peripheral device(s) 580, portable storage device 540, and graphics display system 570 are connected via one or more input/output (I/O) buses.

Mass data storage 530, which can be implemented with a magnetic disk drive, solid state drive, or an optical disk drive, is a non-volatile storage device for storing data and instructions for use by processor unit(s) 510. Mass data storage 530 stores the system software for implementing embodiments of the present disclosure for purposes of loading that software into main memory 520.

Portable storage device 540 operates in conjunction with a portable non-volatile storage medium, such as a flash drive, floppy disk, compact disc, digital video disc, or Universal Serial Bus (USB) storage device, to input and output data and code to and from the computer system 500 of FIG. 5. The system software for implementing embodiments of the present disclosure is stored on such a portable medium and input to the computer system 500 via the portable storage device 540.

User input devices 560 can provide a portion of a user interface. User input devices 560 may include one or more microphones, an alphanumeric keypad, such as a keyboard, for inputting alphanumeric and other information, or a pointing device, such as a mouse, a trackball, stylus, or cursor direction keys. User input devices 560 can also include a touchscreen. Additionally, the computer system 500 as shown in FIG. 5 includes output devices 550. Suitable output devices 550 include speakers, printers, network interfaces, and monitors.

Graphics display system 570 includes a liquid crystal display (LCD) or other suitable display device. Graphics display system 570 is configurable to receive textual and graphical information and processes the information for output to the display device.

Peripheral devices 580 may include any type of computer support device to add additional functionality to the computer system 500.

The components provided in the computer system 500 of FIG. 5 are those typically found in computer systems that may be suitable for use with embodiments of the present disclosure and are intended to represent a broad category of such computer components that are well known in the art. Thus, the computer system 500 of FIG. 5 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, TIZEN and other suitable operating systems.

The processing for various embodiments may be implemented in software that is cloud-based. In some embodiments, the computer system 500 is implemented as a cloud-based computing environment, such as a virtual machine operating within a computing cloud. In other embodiments, the computer system 500 may itself include a cloud-based computing environment, where the functionalities of the computer system 500 are executed in a distributed fashion. Thus, the computer system 500, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computer system 500, with each server (or at least a plurality thereof) providing processor and/or storage resources. These servers may manage workloads provided by multiple users (for example, cloud resource customers or other users). Typically, each user places workload demands upon the cloud that vary in real-time, sometimes dramatically. The nature and extent of these variations typically depends on the type of business associated with the user.

The present technology is described above with reference to example embodiments. Therefore, other variations upon the example embodiments are intended to be covered by the present disclosure.

What is claimed is:

1. A system for assisting automatic speech recognition (ASR), the system comprising:
   a buffer, operable to receive sensor data, the sensor data including at least one acoustic signal, the at least one acoustic signal representing at least one captured sound; and
   a processor, communicatively coupled to the buffer, the processor being operable to:
      store the received sensor data in the buffer;
      analyze the received sensor data to produce new parameters associated with the sensor data, wherein the analyzing includes determining a direction of arrival of the at least one acoustic signal;
      process the stored sensor data based at least in part on the new parameters; and
      provide at least the processed sensor data to an ASR system.

2. The system of claim 1, wherein the ASR system is operable to receive and process the processed sensor data at a speed faster than real time.

3. The system of claim 1, wherein the processor is further operable to replace the sensor data in the buffer with Phell a next portion of the sensor data.

4. The system of claim 1, wherein:
   the processor is further operable to provide the new parameters to the ASR system; and
   the ASR system is configured to analyze the processed sensor data based, at least in part, on the new parameters.

5. The system of claim 1, wherein:
   the processor is further operable to provide the new parameters to the ASR system; and
   in response to receiving a notification from the ASR system, the processor is further operable to send the sensor data to the ASR system for further processing based, at least in part, on the new parameters.

6. The system of claim 1, wherein:
   the ASR system is located remotely; and
   the processor is communicatively coupled to the ASR system via a high speed network.

7. The system of claim 1, wherein the new parameters include one or more of the following: inter-microphone energy level differences, inter-microphone phase differences, acoustic signal energy, estimated pitch, and estimated saliency of the pitch.

8. The system of claim 1, wherein processing the stored sensor data includes separating a clean voice from a noise in the at least one acoustic signal, the processed sensor data provided to the ASR system including the clean voice.

9. The system of claim 8, wherein the separating includes performing at least one of the following: noise suppression and noise reduction.

10. The system of claim 1, wherein the sensor data are provided by one or more of the following:
    a sound sensor configured to capture the at least one acoustic signal;
    a motion sensor;
    an environment sensor;
    a radio sensor; and
    a light sensor.

11. A non-transitory computer-readable storage medium having embodied thereon instructions, which, when executed by one or more processors, perform steps of a method, the method comprising:
    receiving sensor data, the sensor data including at least one acoustic signal, the at least one acoustic signal representing at least one captured sound;
    storing the received sensor data in a buffer;
    analyzing the received sensor data to produce new parameters;
    processing the stored sensor data based at least in part on the new parameters; and
    providing the processed sensor data to an automatic speech recognition (ASR) system, the ASR system being operable to receive and process the processed sensor data at a speed faster than real time.

12. A method for assisting automatic speech recognition (ASR), the method comprising:
    receiving sensor data, the sensor data including at least one acoustic signal, the at least one acoustic signal representing at least one captured sound;
    storing the received sensor data in a buffer;
    analyzing the received sensor data, including determining a direction of arrival of the at least one acoustic signal, to produce new parameters;
    processing the stored sensor data based at least in part on the new parameters; and
    providing the processed sensor data to an ASR system.

13. The method of claim 12, wherein the ASR system, to which the processed sensor data is provided, is operable to receive and process the processed sensor data at a speed faster than real time.

14. The method of claim 12, further comprising replacing the sensor data in the buffer with a next portion of the sensor data.

15. The method of claim 12, further comprising:
    providing the new parameters to the ASR system, wherein the ASR system is configured to analyze the processed sensor data based at least in part on the new parameters.

16. The method of claim 12, wherein the ASR system is located remotely and operable to receive the processed sensor data via a high-speed network.

17. The method of claim 12, wherein the new parameters include one or more of the following: inter-microphone energy level differences, inter-microphone phase differences, acoustic signal energy, estimated pitch, and estimated saliency of the pitch.

18. The method of claim 12, wherein processing the stored sensor data includes separating a clean voice from a noise in the at least one acoustic signal, the processed sensor data provided to the ASR system including the clean voice.

* * * * *